United States Patent [19]
Hickman

[11] Patent Number: 5,638,138
[45] Date of Patent: Jun. 10, 1997

[54] METHOD FOR ELECTRONIC IMAGE DYNAMIC RANGE AND CONTRAST MODIFICATION

[76] Inventor: Charles B. Hickman, 2890 Topaz Ave., Simi Valley, Calif. 93063

[21] Appl. No.: 257,383

[22] Filed: Jun. 9, 1994

[51] Int. Cl.$^6$ .............................. H04N 5/52; H04N 9/68; H04N 9/77; H04N 9/64
[52] U.S. Cl. ..................... 348/678; 348/645; 348/712; 348/713
[58] Field of Search ..................... 348/708, 709, 348/710, 711, 712, 720, 659, 660, 661, 571, 625, 645, 646, 647, 671, 674, 675, 676, 678, 679, 681, 685, 686; H04N 9/68, 9/77, 9/64

[56] References Cited

U.S. PATENT DOCUMENTS

| 4,568,978 | 2/1986 | Cosh | 348/678 X |
|---|---|---|---|
| 4,712,132 | 12/1987 | Soca | 348/679 |
| 4,812,903 | 3/1989 | Wagensonner et al. | 348/645 X |
| 4,829,381 | 5/1989 | Song et al. | 348/674 |
| 4,831,434 | 5/1989 | Fuchsberger | 348/645 X |
| 5,446,504 | 8/1995 | Wada | 348/645 |

OTHER PUBLICATIONS

Oppenheim et al "Digital Signal Processing", Prentice Hall, 1975, pp. 487–489.

Primary Examiner—John K. Peng
Assistant Examiner—John W. Miller

[57] ABSTRACT

A dynamic range and contrast modification method for electronic images, and digital and analogue implementations are disclosed. Dynamic range changes are accomplished by making linear and nonlinear modifications to the low frequency component. Contrast changes are accomplished by making cross dependent, linear, and nonlinear modifications to the high frequency component. Cross dependent modifications are modifications that depend upon the changes to the low frequency component. Modifications are achieved using processor elements that implement mathematical operations. An automatic gain control, AGC, is used to control the low frequency component modification for some embodiments.

70 Claims, 9 Drawing Sheets

METHOD FOR ELECTRONIC IMAGE DYNAMIC RANGE AND CONTRAST MODIFICATION

FIELD OF THE INVENTION

The present invention generally relates to video or electronic image signal processing, and more particularly to techniques for modifying the dynamic range and contrast of video signals.

BACKGROUND OF THE INVENTION

Many electronic images such as news and sporting events are taken under uncontrolled lighting conditions. Thus image dynamic range and contrast may be less than aesthetically pleasing. On the other hand, medical images such as fluoroscopic videos may contain such poor contrast and dynamic range so as to limit their value. These and other electronic imaging conditions need to be addressed in a timely and cost effective manner.

A wide variety of techniques and systems have been devised for the processing of electronic image signals with less than ideal dynamic range and/or contrast. A large number of systems are based first upon the analysis of the image using a histogram. Then based upon this analysis the image is modified under operator control. Some techniques consist primarily of simple gray scale modification. On the other hand, some techniques are more sophisticated such as the system set forth in U.S. Pat. No. 5,012,333 to Lee et al. Most of these techniques depend upon a relatively slow computer to perform signal processing. In general these techniques are effective in image improvement, but they can be relatively time consuming especially in the derivation of the histogram. When many frames of electronic images such as live sports, news events, or fluoroscopic images are required to be processed at real time or close to real time most techniques are too time consuming. Faster computers could be employed for signal processing, but this usually increases the cost substantially.

The text Digital Signal Processing by Alan V. Oppenheim and Ronald W. Schafer, Prentice-Hall, 1975 in the chapter titled Homomorphic Signal Processing teaches that some classes of images can be improved with signal processing without extensive analysis of a histogram. The author states that observed images are formed by a multiplying of pattern illumination by pattern reflectance to produce the brightness image. The author also, states that these components of the brightness image can be separated as a function of frequency content. That is to say, in general the illumination component is in a different frequency range than the reflectance component. The author concludes that in general within an electronic image illumination is a low frequency signal and reflectance is a high frequency signal.

The author's signal processing gave image improvement, but addresses only a very limited number of image problems. Therefore, if one could implement a system that could be used to improve a larger variety of image dynamic range and contrast type problems in a timely manner using adjustable hardware, this would be desirable.

SUMMARY OF THE INVENTION

Image luminance first is separated into high and low frequency components. The low frequency component is processed through mathematical operators, processing elements, whose variable values can be selected manually by an observer of the modified and unmodified images, or automatically by a computer that contains an edit list or other criteria for adjustments. The high frequency component may then be separated into positive and negative going excursion components, or processed as a single signal.

The high frequency component is then modified with proportionalities that are related to the instantaneous changes to the low frequency component with variable values being determined by either an observer or a computer as above. Then the high frequency component is processed through mathematical operators whose variables are also to be selected as above. Then high and low frequency components are then recombined. If the image to be modified is in color, then the color image portions red, green, blue, or chrominance can be modified directly proportional to the instantaneous ratio of magnitude changes to the luminance image.

The primary object of the present invention is to provide dynamic range and contrast modifications to video images. It is a further object of the present invention to provide a stand alone system wherein an operator interactively adjusts dynamic range and contrast.

Another object of the present invention is to provide a system wherein dynamic range and contrast can be accomplished under computer control.

Another object of the present invention is to provide a system wherein the low frequency portion of the image can be adjusted automatically under the control of automatic gain control, AGC, circuitry.

These and other objects and advantages of the present invention will become more readily apparent to those ordinarily skilled in the art when taken in conjunction with the following description and accompanying drawings which form a part of this application.

DETAILED DESCRIPTION OF THE PREFERRED EMBODIMENT

An improved dynamic range and contrast electronic image processing system is disclosed. In the following description for purposes of explanation, numerous details are set forth to provide a thorough understanding of the present invention. However, it will be apparent to one ordinarily skilled in the art that these details are not required in order to practice the invention.

Figure 1:
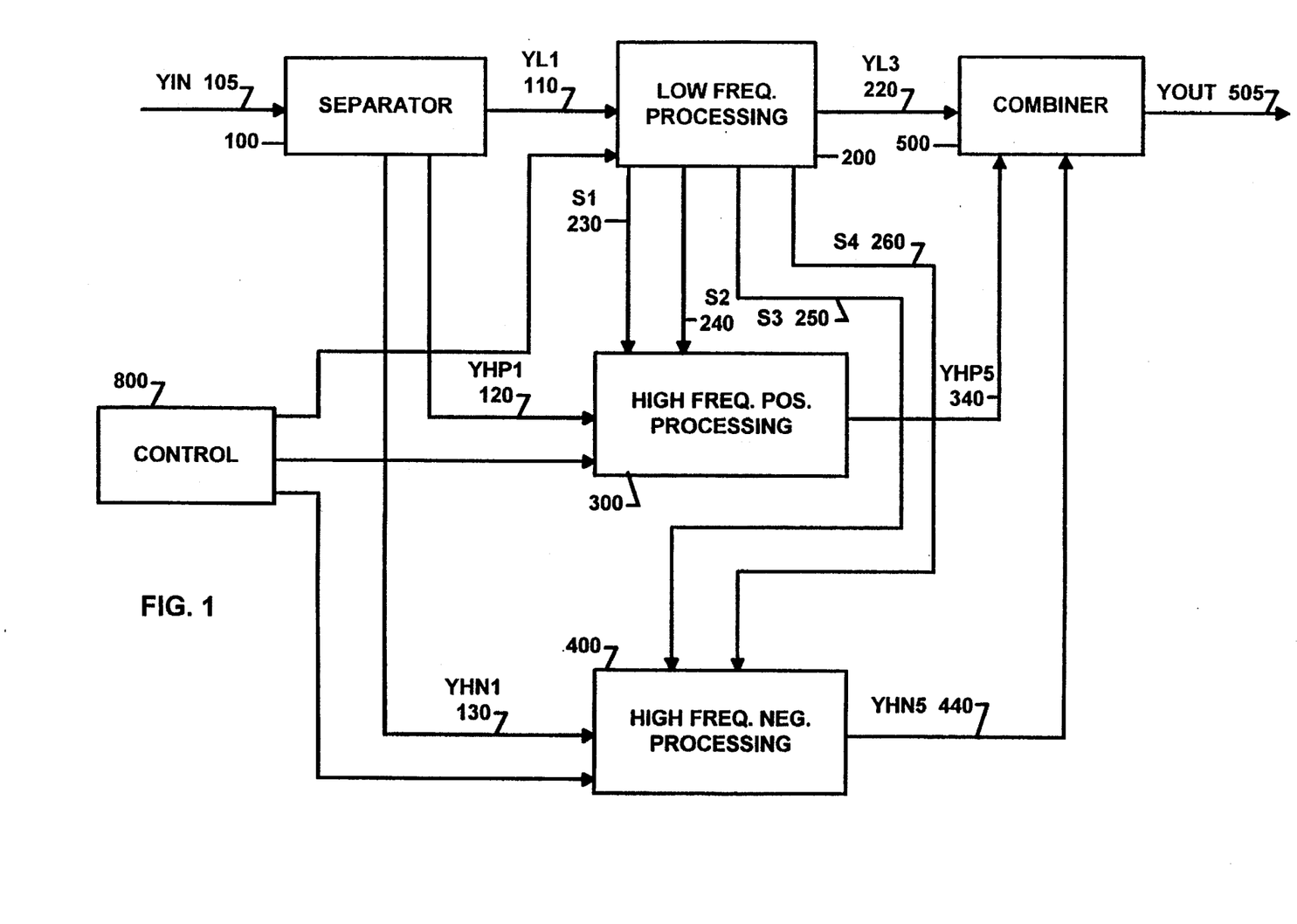
FIG. 1 is an overall functional block diagram of the luminance dynamic range and contrast image processing in accordance with the present invention.
Figure 2:
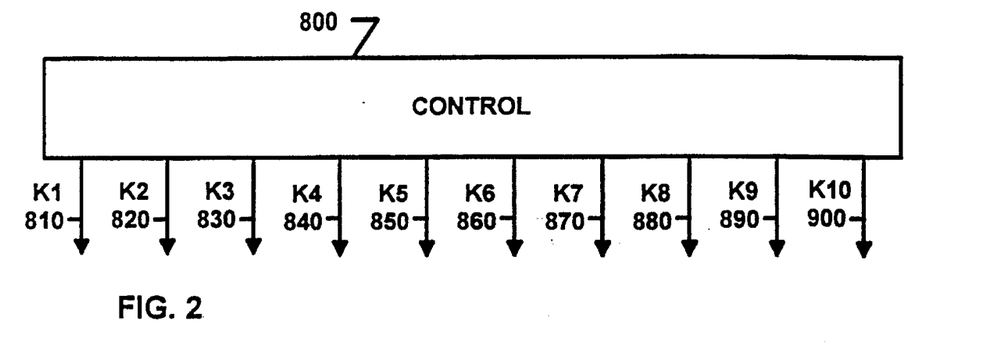
FIG. 2 is a block diagram of the specific variable control signals that are that are used for the control of signal processing in FIG. 1.

FIG. 1 depicts the top level blocks for modification of dynamic range and contrast of image luminance component. Digital luminance YIN 105 is received by a separator 100. Within the separator 100 the luminance is separated into both a high and low frequency components. The high frequency component is then separated into a positive voltage and negative voltage components. Further the polarity of the high frequency negative voltage component is changed to a positive voltage signal, high frequency negative+ component.

Frequency separation can be of any standard forms. For example, the low-pass filter could be either one or two dimensional. The high frequency component could be derived by the subtraction of the low frequency component from the unfiltered signal; or by the division of the low frequency component into the unfiltered signal. A two-dimensional low-pass filter is preferred. The subtraction method for deriving the high frequency component is preferred.

The separator 100 low frequency output YL1 110 is sent to a low frequency processor 200 that sends its processed digital signal YL3 220 to a combiner 500. Processing is performed based upon the value of controlling signals from a control block 800. The low frequency processor 200 generates process control signals S1 230 and S2 240 that are sent to a high frequency, positive, processor 300, and process control signals S3 250 and S4 260 that are sent to a high frequency, negative, processor 400. The separator 100 high frequency positive component output YHP1 120 is sent to the high frequency, positive, processor 300 that sends its processed digital signal YHP5 340 to the combiner 500. The separator 100 high frequency negative+component output YHN1 130 is sent to the high frequency, negative, processor 400 that sends its processed digital signal YHN5 440 to the combiner 500. The combiner 500 subtracts YHN5 440 from the arithmetic sum of the other two inputs, YL3 220 and YHP5 340.

Figure 3:
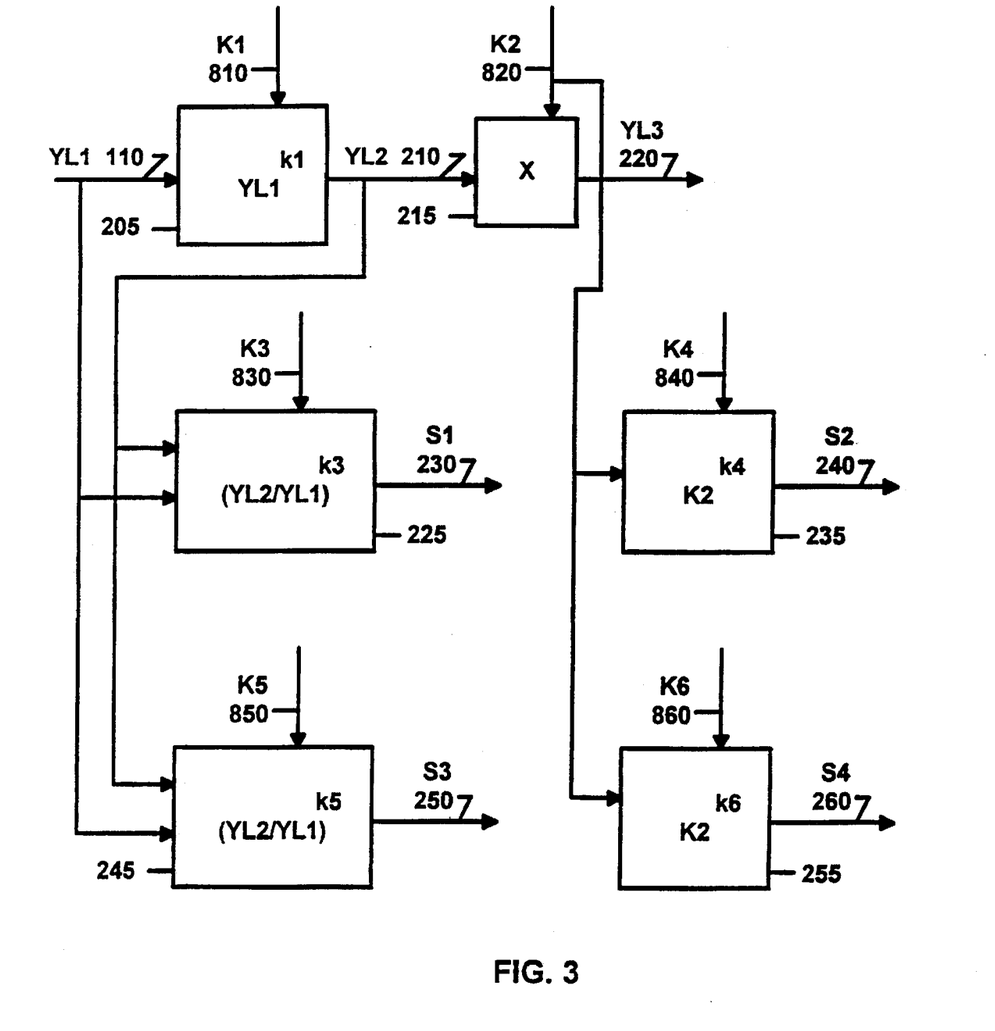
FIG. 3 is a block diagram of the processing elements within the low frequency processing block of FIG. 1.

FIG. 3 depicts the processing elements within the low frequency processing block 200 of FIG. 1. Separator 100 sends the low frequency component YL1 110 to the low frequency processor 200. The low frequency component YL1 110 is received by a digital mapping PROM, programmable read only memory, 205. The PROM 205 has sixteen address bits. Ten address bit of the PROM 205 are used for YL1 110 and six bits are used for control K1 810. The PROM 205 contains look-up tables that are used to map YL1 110 input to a YL2 210 output based upon K1 810 being used to select maps that contain predetermined mathematical exponent modifiers. The sixty four separate mappings that can be addressed correspond in 205 to exponent k1 values of 0.30 through 1.90 in steps of 0.025. Thus if K1 810 had the value of forty two this would correspond to a k1 value of 1.35, and the PROM 205 would perform the following mapping:

$$YL2 = YL1^{1.35} \quad (1)$$

It should be noted that in 205 k1 values can be other than those illustrated. For instance negative values of k1 could be used for special effects purposes. Thus in this case and elsewhere herein specific values are for the given embodiment and should not be construed so as to limit the use of other values for other embodiments. The PROM 205 output YL2 210, expressed in sixteen digital data bits, is sent to a digital multiplier 215 and is multiplied by a variable control K2 820 to produce an output product YL3 220 that is rounded to the ten most significant digital data bits. In FIG. 1 it can be seen that this output product YL3 220 is sent to the combiner 500. In order to maintain resolution during extreme amplitude compression PROM 205 output is expressed in sixteen digital data bits. After multiplication in 215 the low frequency output YL3 220 can be rounded to ten digital data bits.

Oftentimes bright portions of an image contain very low contrast. Thus in order to improve the appearance of that image it may be desirable to compress the bright portion of the image while at the same time providing extra enhancement for the contrast in that same portion of the image. In FIG. 1 output controls S1 230, S2 240, S3 250, and S4 260 from the low frequency processor 200 can perform the desired selective enhancement and other functions. These controls S1 230, etc. can be used to modify the contrast represented by the high frequency components YHP1 120 and YHN1 130 based upon changes to the general lighting represented by the low frequency component YL1 110. FIG. 3 depicts the generation of these controls. A block 225 consists of a two stage process to generate the control S1 230. First the instantaneous transfer ratio of block 205 output YL2 110 to input YL1 120 is determined using a digital divider. Then the quotient is modified through a mapping PROM in a similar manner as the mapping PROM in block 205. The mapping in this block 225 differs in that the exponent values, k3, vary between −3.1 to +3.2 in steps of 0.1. Thus if K3 830 were to have a value of eleven then 225 would execute the following equation:

$$S1 = (YL2 + YL1)^{-2.0} \quad (2)$$

S3 250 is generated by a block 245 that functions the same as block 225 except it is controlled by K5 850.

Blocks 235 and 255 consist of mapping PROM's that operate on the linear transfer ratio of block 215. This transfer ratio is equal to K2 820. K4 840 and K6 consist of six bits, and are used to vary the mapped exponent between −3.1 and 3.2 in steps of 0.1 as explained for block 225 above.

Figure 4:
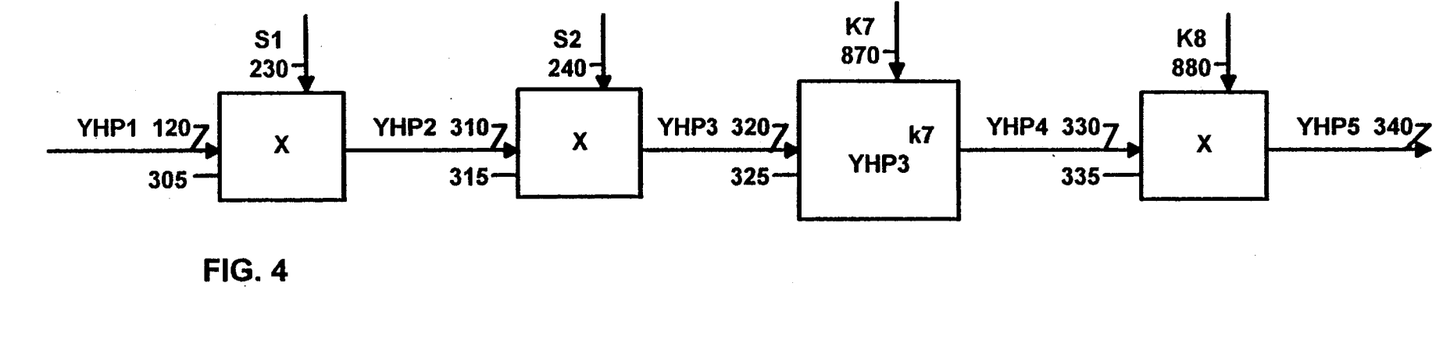
FIG. 4 is a block diagram of the processing elements within the high frequency, positive, processing block of FIG. 1.

FIG. 4 depicts the processing elements within the high frequency, positive, processing block 300 of FIG. 1. The high frequency positive voltage YHP1 120 from separator 100 is multiplied by S1 230 from block 225 to produce a product YHP2 310. YHP2 310 is then multiplied by S2 240 from block 235 to produce a product YHP3 320. YHP3 320 is sent to a mapping PROM block 325 that is controlled by K7 870 from block 800. This PROM is identical to and functions the same the PROM in block 205 as explained above. Block 325 sends its output YHP4 330 to a digital multiplier 335. YHP4 330 is multiplied by control K8 880 to produce a product YHP5 340 that is seen in FIG. 1 to be one of the inputs to the combiner 500.

Figure 5:
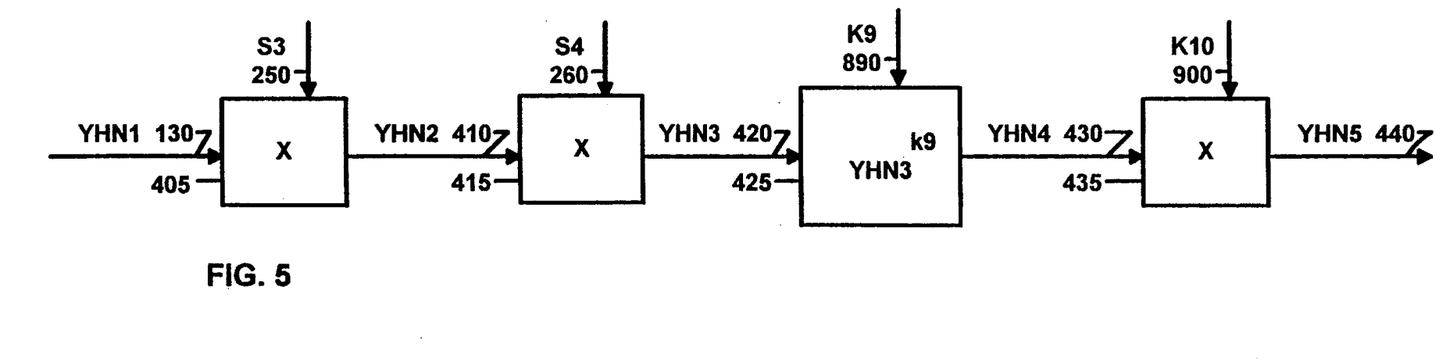
FIG. 5 is a block diagram of the processing elements within the high frequency, negative, processing block of FIG. 1.

FIG. 5 depicts the processing that occurs to the high frequency negative+component YHN1 130 in FIG. 1 high frequency, negative, processing block 400. Processing block 400 functions in the same manner as block 300 as explained above. Block 400 sends its output YHN5 440 to the combiner 500 as can be seen in FIG. 1. Combiner 500 signal output YOUT 505 is the modified luminance.

Figure 6:
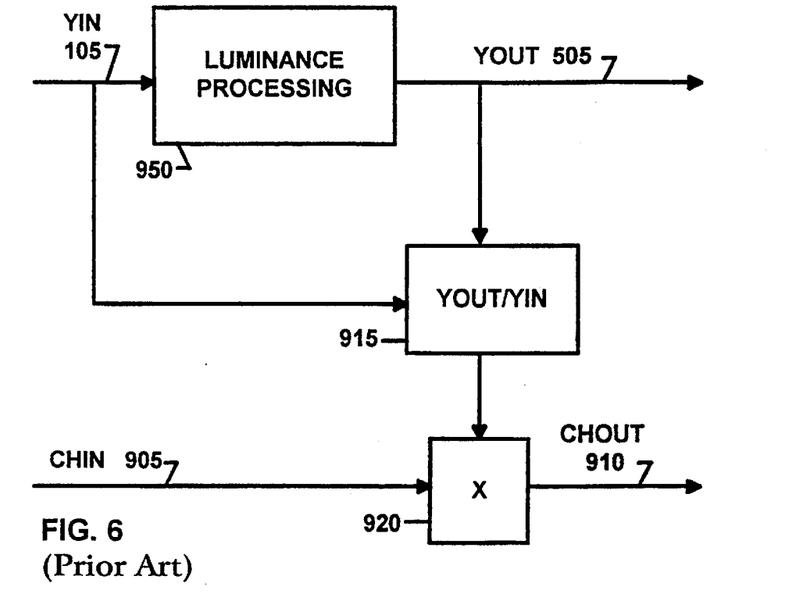
FIG. 6 is a block diagram to show how the luminance processor of FIG. 1 can be used to modify image chrominance components.
Figure 7:
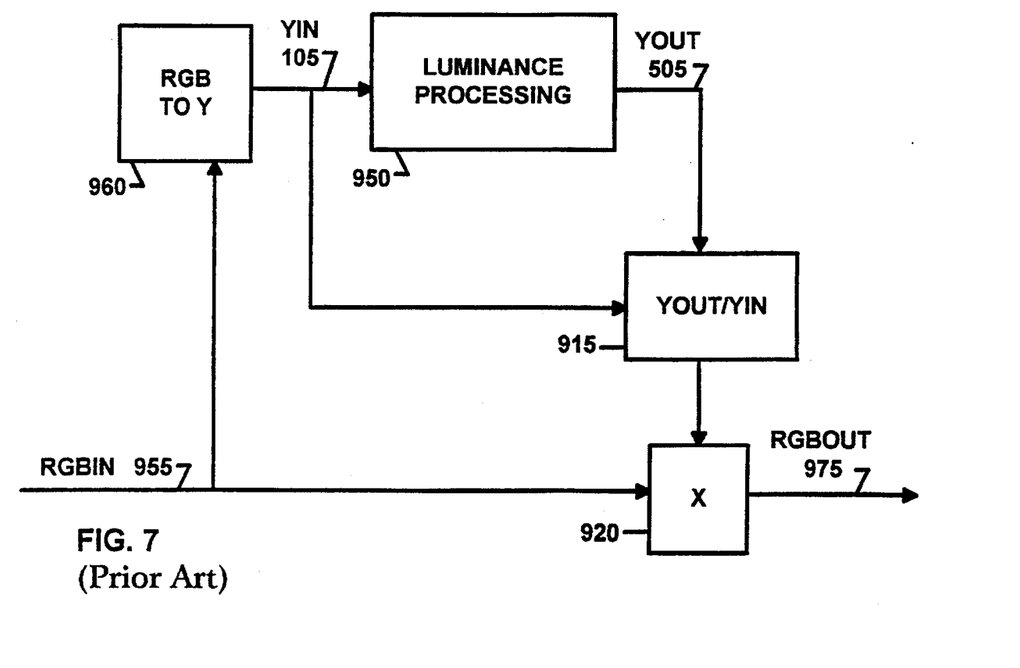
FIG. 7 is a block diagram to show how the luminance processor of FIG. 1 can be used to modify image RGB components.
Figure 15:
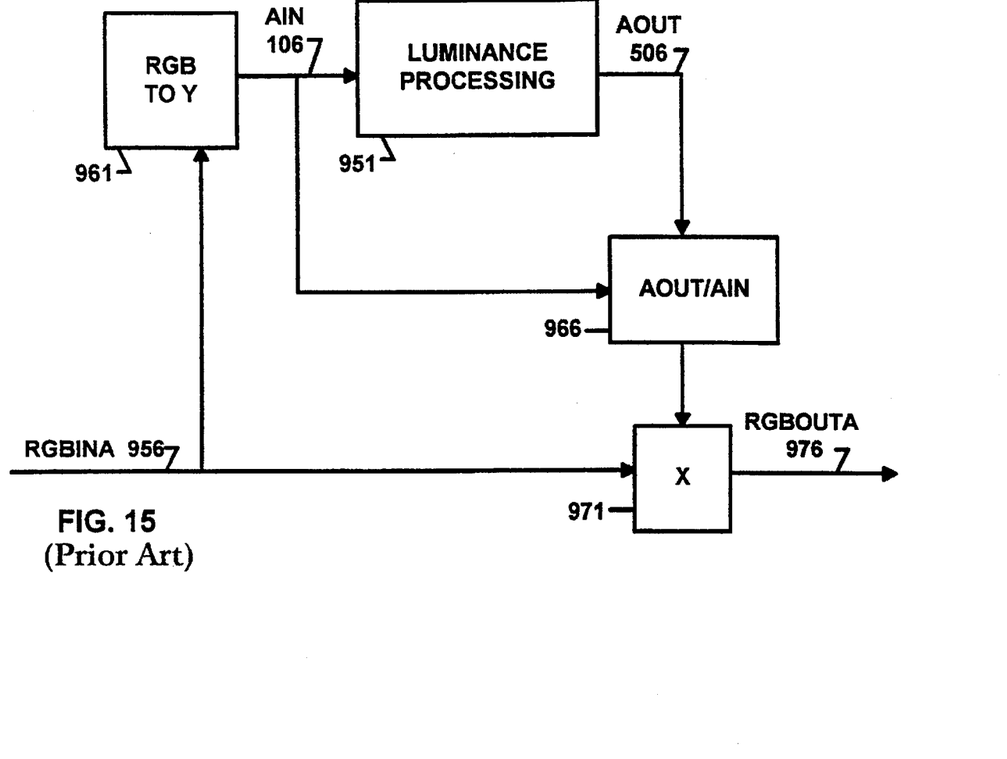
FIG. 15 is a block diagram to show how the luminance processor of FIG. 8 can be used to modify analogue image RGB components.

FIGS. 6, 7, and 15 are added as examples as to how the luminance processors 950 and 951 may be used for modification of the electronic image color components, but are not claimed as novel herein.

FIG. 6 depicts how chrominance components CHIN 905 can be modified by same ratio 915 as the change in the luminance processor 950. The luminance processing 950 is depicted in FIG. 1 and has been explained above. The instantaneous transfer ratio of the luminance processor 950 is calculated in block 915. The ratio is determined by a digital divider that divides YOUT 505 by YIN 105. The ratio from 915 is used in a digital multiplier 920 to scale the chrominance components CHIN 905 to produce modified chrominance components CHOUT 910. The chrominance components CHIN 905 are composed of standard chrominance terms $C_r$ and $C_b$. One ordinarily skilled in the art can appreciate the fact that for reasons of simplicity zero processing delays are assumed herein. This assumption allows for the explanation of the essence of the present invention without the inclusion of numerous compensating delays that do not enhance the understanding of the patent. Thus when the ratio is calculated in 915, YOUT 505 corresponds to the same image element as YIN 105 except it may have been modified in amplitude by the luminance processor 950.

In like manner, FIG. 7 depicts how color components are modified proportionately to the transfer ratio of the luminance processor 950. First the input signal RGBIN 955, expressed in R,G,B, red, green, blue format is transformed within 960 to luminance signal YIN 105. Processors 950, 915, and 920 function as explained above. The R,G,B signals RGBIN 955 are scaled by multiplier 920 to the same transfer ratio as the luminance processor 950. It should be apparent that other color components can be scaled with the same transfer ratio as the luminance processor 950.

One example of how the luminance processor 950 could be used is in the case where portions of the image are aesthetically satisfactory, however other portions are too bright and have very low contrast. The goal is to make significant changes to the too bright portion while at the same time making much smaller changes to the other portions of the image. In 205 k1 would be set to 0.60 causing the brighter portions of the image to be compressed proportionately more in amplitude than the other portions. For digital multiplier 215 K2 would be set to 10.0 to add a gain to compensate for the amplitude compression of the acceptable portion of the image. This causes the average brightness of the image to be raised. In 225 k3 is set to −0.6 causing the greatest contrast enhancement to occur in the area of the image that had the greatest range compression. In 245 k5 is set to −0.1 to cause some enhancement in the negative direction but not so much as to drive the image deep into black. In 235 k4 is set to 0.0; and in 255 k6 is set to 0.0. Controls K7 870, K8 880, K9 890, and K10 900 are set to taste. The forgoing and the following are based upon the maximum normalized image amplitude having the value 1020.

Another example of how the luminance processor 950 could be used is in the case of a sporting event where the contrast is good, but part of the playing area is in sunlight and part of the playing area is in shadow. This can be annoying to the viewer. On the surface this appears to be the much the same as the previous example. The big difference is that contrast is acceptable. Once again the brighter portion of the low frequency component YIN 105 is compressed into region of the darker portion of the image, and then linearly expanded. This corresponds to k1 in 205 being set to 0.4 and K2 820 being set to 50. Because contrasts are acceptable, k3 in 225, k4 in 235, k5 in 250, and k6 in 255 should be maintained at or around 1.0. Contrast can be modified to taste using K7 870, K8 880, K9 890, and K10 900.

One can see that a whole host of dynamic range expansion and compression, and contrast enhancement and suppression combinations can be performed using the present invention.

DESCRIPTION OF ALTERNATE EMBODIMENTS

An analogue embodiment using homomorphic signal processing to accomplish is disclosed. Homomorphic signal processing allows mathematical exponent operations on signals using linear circuitry. By converting signal voltages to their logarithmic equivalent voltages one can accomplish all of the mathematic operations that were required for the preferred embodiment using linear circuitry to implement the well known mathematical rules associated with the use of logarithms. For example, multiplication operations are accomplished by the summation of two logarithmic values. After linear processing the antilogarithmic operation is performed to convert to standard signal voltage form. From the following detailed description it will become apparent that digital homomorphic embodiments can be implemented using look-up tables to perform the logarithmic and antilogarithmic operations, and standard circuitry for the performance of the linear operations.

Figure 8:
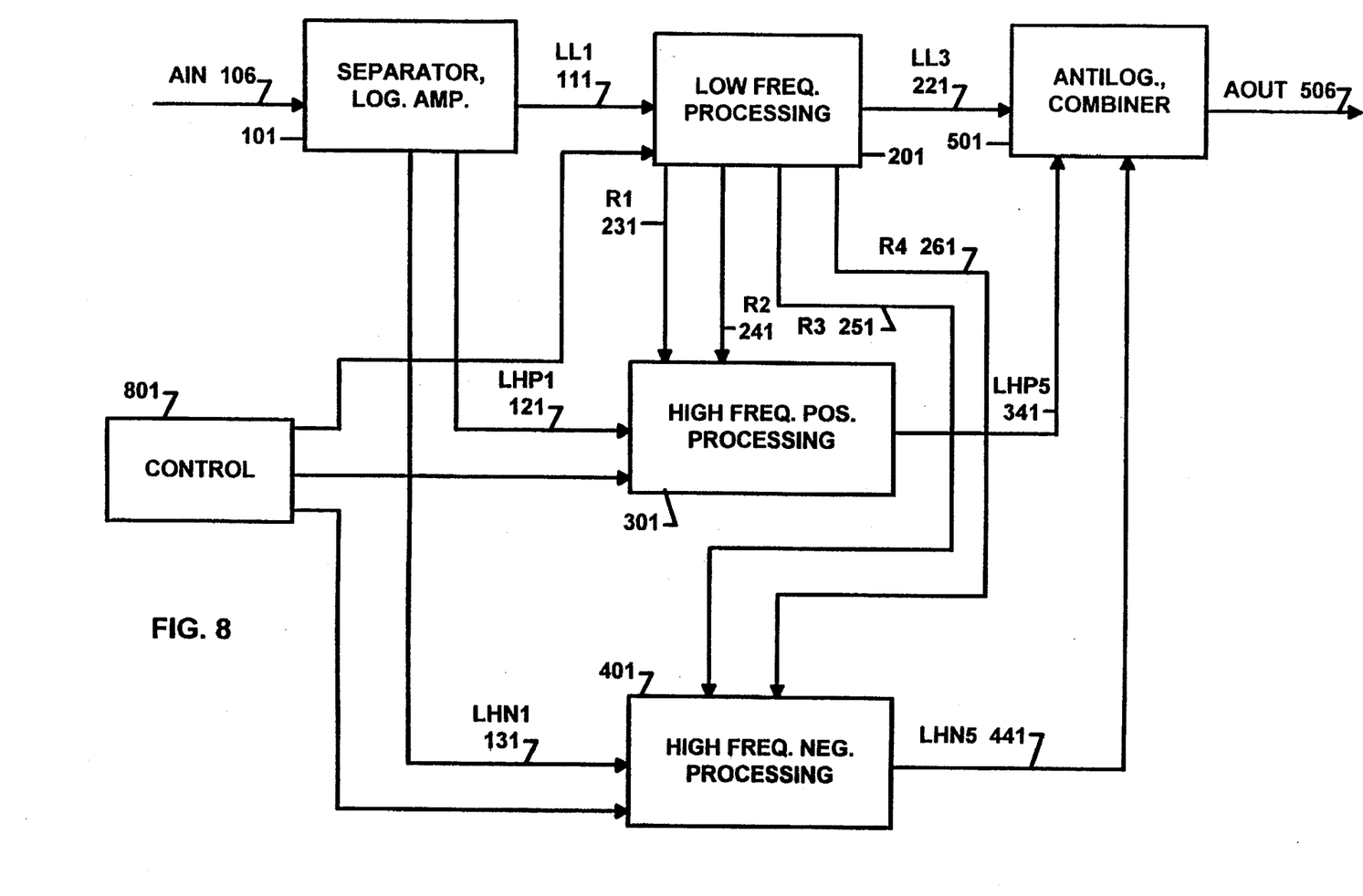
FIG. 8 is an overall functional block diagram of the luminance dynamic range and contrast image homomorphic processing for an analogue embodiment in accordance with the present invention.

FIG. 8 shows the top level block diagram for analogue luminance signal processing. Analogue luminance AIN 106 is sent to a separator 101 where high and low frequency components are separated. The high frequency component is further separated into positive and negative voltage components with the negative voltage component being converted to a positive voltage for processing. These three components, low frequency, high frequency positive, and high frequency negative, are each converted to logarithmic equivalent voltages using Analog Devices' logarithmic amplifier AD640.

The separator 101 low frequency output LL1 111 is sent to a low frequency processor 201 that sends its processed logarithmic signal LL3 221 to a combiner 501. The low frequency processor 201 generates process control signals R1 231 and R2 241 that are sent to a high frequency, positive, processor 301, and process control signals R3 251 and R4 261 that are sent to a high frequency, negative, processor 401. The separator 101 high frequency positive component output LHP1 121 is sent to the high frequency, positive, processor 301 that sends its processed logarithmic signal LHP5 341 to the combiner 501. The separator 101 high frequency negative component output LHN1 131 is sent to the high frequency, negative, processor 401 that sends its processed logarithmic signal LHN5 441 to the combiner 501.

The combiner 501 performs the antilogarithmic operation on each of the three inputs, LL3 221, LHP5 341, and LHN5 441. The antilogarithmic signal derived from LHN5 441 is subtracted from the sum of the two other antilogarithmic signals derived from LL3 221 and LHP5 341 to produce output AOUT 506. Discounting biasing, scaling, etc. in its simplified form combiner 501 performs the following mathematical operation:

$$AOUT = 10^{LL3} + 10^{LHP5} - 10^{LHN5} \qquad (3)$$

Figure 13:
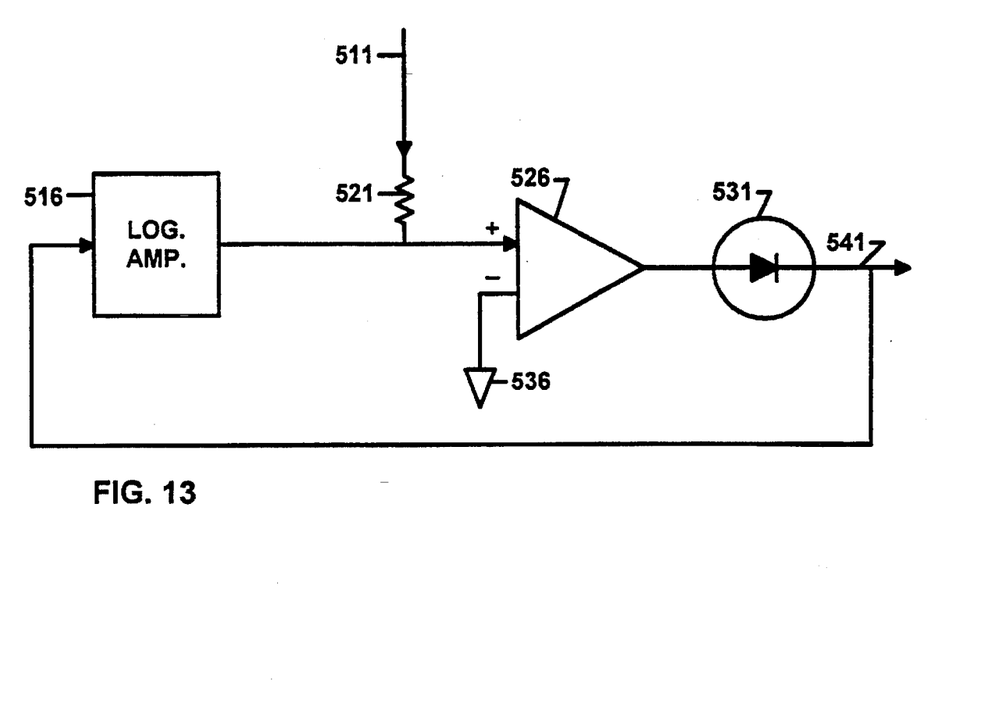
FIG. 13 is a simplified schematic to show how a logarithmic voltage is converted to an antilogarithmic voltage for an analogue embodiment of the present invention.

FIG. 13 depicts how a typical logarithmic voltage 511 is converted to an antilogarithmic voltage 541 using negative feedback circuitry. The positive logarithmic voltage 511 is sent through a resistor 521 to an operational amplifier 526's noninverting input. This voltage 511 is compared to analogue ground 536 to produce a positive voltage out of the operational amplifier 526. This positive voltage is passed through a forward biased diode 531 to a logarithmic amplifier 516. The logarithmic amplifier 516 is the same type part, AD640, that was used to produce the logarithmic voltages as described for the separator 101. This positive input voltage causes the logarithmic amplifier 516 to produce a negative current proportional to the logarithm of its input voltage 541. This negative current enters resistor 521 to produce a negative voltage to offset the positive logarithmic input voltage 511. Diode 531 is used to block negative voltages from the operational amplifier 526 from entering the logarithmic amplifier 516 in order to prevent the circuitry from functioning in the positive feedback mode. The logarithmic amplifier 516 produces a negative current based upon the absolute magnitude of its input voltage 541. Thus if the blocking diode were not present positive feedback could occur.

Figure 9:
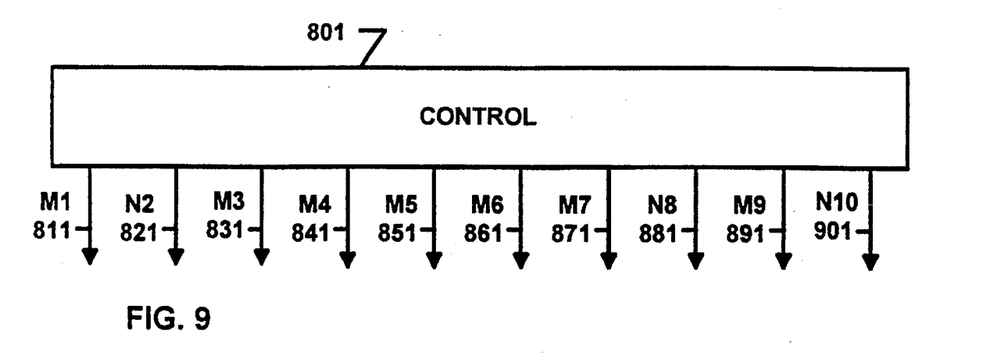
FIG. 9 is a block diagram of the specific variable control signals that are that are used for the control of signal processing in FIG. 8.

A control block 801 is used to control the processing within the three processors, 201, 301, and 401. FIG. 9 depicts the particular controls M1 811, N2 821, etc. from the control block 801. The M controls M1 811, M3 831, are used to control variable potentiometer. The potentiometer could the electronic type under computer control, but for this embodiment they are passive components and the M controls are shaft adjustments by an operator. The N controls N2 821, N8 881, etc. are adjustable d.c. voltages that are proportional to the desired logarithmic values for process control.

Figure 10:
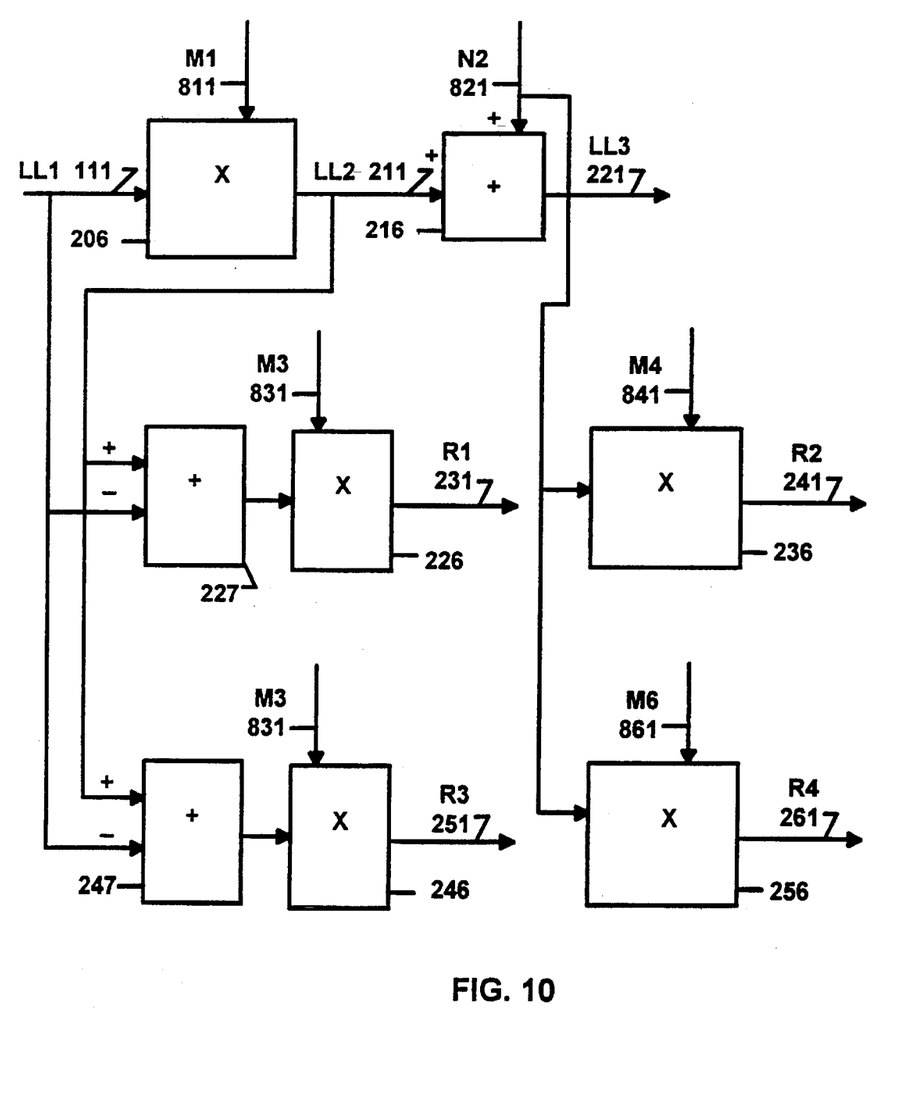
FIG. 10 is a block diagram of the linear analogue processing elements within the low frequency processing block of FIG. 8.

FIG. 10 depicts the processing elements for the modification of the logarithmic voltage signal within the low frequency processor 201. The logarithmic analogue low frequency signal LL1 111 is sent to a multiplier 206. Multiplier 206 is implemented with a twenty turn potentiometer used as a variable resistor in the feedback path of an operational amplifier circuit. The potentiometer varies the gain between the value of 0.5 and 2.0. This is analogous to modifying the antilogarithmic value of the signal with an exponent as was shown in block 205 above. The output LL2 211 from multiplier 206 is sent to a summer 216 to be added to the d.c. control voltage N2 821. N2 821 control voltage can be either positive or negative in polarity, and is proportional to the logarithm of the control value by which the low frequency component is to be multiplied.

Figure 14:
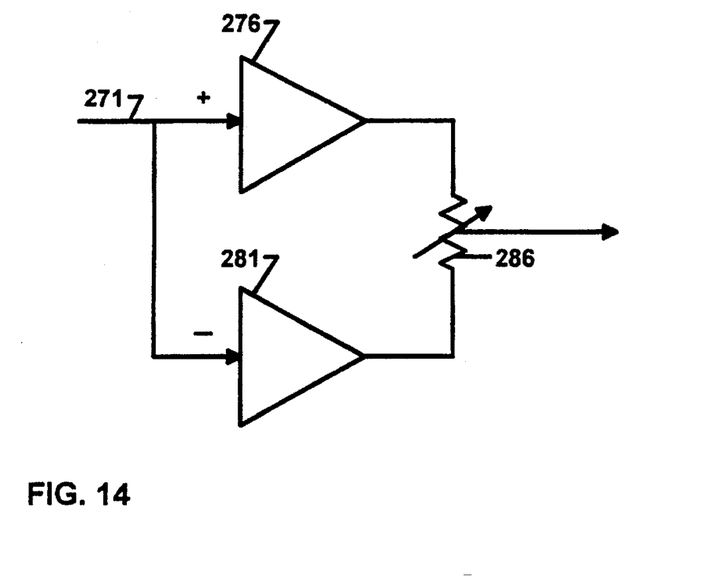
FIG. 14 is a simplified schematic to show how a logarithmic voltage is multiplied by either a positive or negative value for an analogue embodiment of the present invention.

A summer 227 subtracts multiplier 206 input LL1 111 from multiplier 206 output LL2 211, and sends the result to multiplier 226. FIG. 14 depicts how the multiplier 226 is implemented. The logarithmic voltage enters on line 271 and is amplified by a noninverting amplifier 276 and an inverting amplifier 281. Each amplifier has a fixed gain equal to the maximum value expected for M3 831, M3 max. Thus by adjusting the twenty turn potentiometer 286 continuous gain values between +M3 max. and −M3 max. are obtained at the potentiometer wiper which in this case corresponds to the multiplier 226 output R1 231. Blocks 247 and 246 have a different control, M3, but function the same as blocks 227 and 226 respectively as explained above. Block 246 produces output R3 251. Multipliers 236 and 256 receive N2 821 as input and function the same as was described for 226 above.

Figure 11:
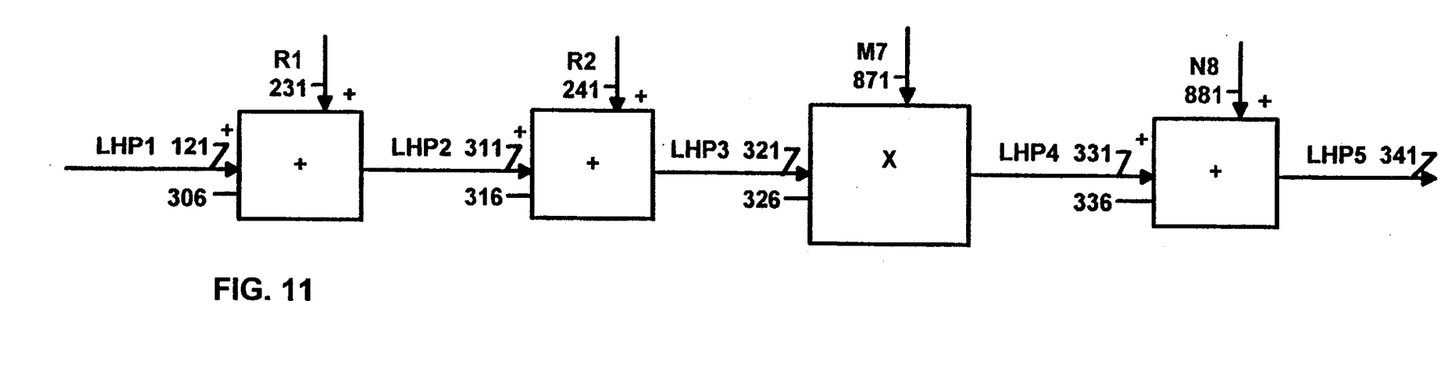
FIG. 11 is a block diagram of the linear analogue processing elements within the high frequency, positive, processing block of FIG. 8.
Figure 12:
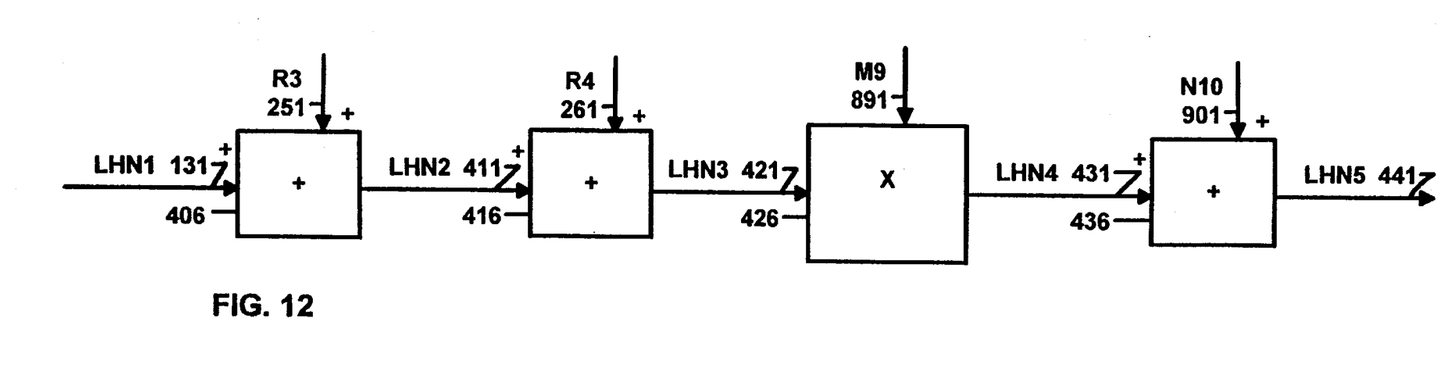
FIG. 12 is a block diagram of the linear analogue functions processing elements within the high frequency, negative, processing block of FIG. 8.

FIG. 11 depicts the processing elements within the high frequency, positive, processor 301. Processor input LHP1 121 from separator 101 is added in a summer 306 to R1 231 from multiplier 226 to produce output LHP2 311. LHP2 311 is added in a summer 316 to R2 241 from multiplier 236 to produce output LHP3 321. These two summers 306 and 316 are used to modify the analogue logarithmic high frequency component with logarithmic voltages derived from the modifications that were made to the analogue logarithmic low frequency component. LHP3 321 is sent to a multiplier 326 that functions the same as multiplier 206 to produce output LHP4 331. LHP4 331 is sent to a summer that functions the same as summer 216. FIG. 12 depicts the processing elements within high frequency, negative, processor 401. The processing in FIG. 12 is identical to the processing in FIG. 11 except it has different process controls, R3 251, R4 261, M9 891, and N10 901. Combiner 501 puts out signal AOUT 506.

FIG. 15 depicts how color components are modified proportionately to the transfer ratio of the luminance processor 951. First the input signal RGBINA 956, expressed in analogue R,G,B, red, green, blue, format is transformed within 961 to luminance signal AIN 106. Luminance processor 951 functions as explained above. Processor 966 calculates the luminance processor transfer ratio by dividing AOUT 506 by AIN 106 with the result being sent to multiplier 971. Then the R,G,B signals RGBINA 956 are scaled by multiplier 971 to the same transfer ratio as the luminance processor 951. Processor blocks 966 and 971 use Analog Devices' part AD734.

Figure 16:
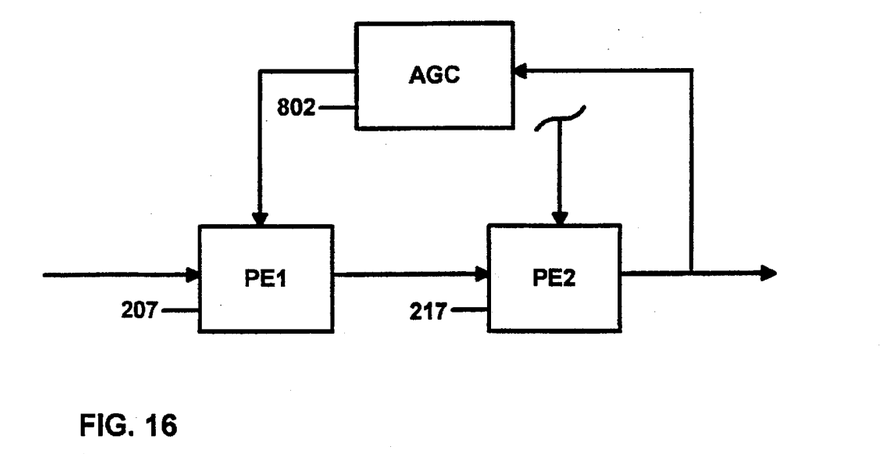
FIG. 16 is a block diagram to show how an automatic gain control, AGC, can be incorporated into the primary path for low frequency processing.

FIG. 16 depicts how an AGC 802 circuit can be connected to automatically control the low frequency processor, e.g. 200 or 201, to vary the dynamic range of the electronic image. Two processing elements PE1 207 and PE2 217 correspond to 205 and 215 respectively, or 206 and 216 respectively. Feedback is taken from the second processing element PE2 217, but could be taken from the first processing element PE1 207. This feedback is sent to the AGC 802. A peak type AGC 802 is preferred over an average or other type of AGC. The AGC 802 output is sent to the variable control input of PE1 207.

By setting the variable value of PE2 217 to a high value, range equalization can occur. That is to say both nonlinear compression and linear expansion can occur to compensate for unbalanced lighting conditions in the original image. By setting the variable value of PE2 217 to a very small value nonlinear expansion can occur to improve the appearance of an image of a flat field scene. From the foregoing examples one ordinarily skilled in the art can see that with the AGC 802 present, the present invention could be incorporated directly into a video camera with very few manual adjustments required by an operator for a given scene environment.

What is claimed is:

1. A dynamic range and contrast modification method comprises the steps of:
   Converting an RGB electronic image signals of color components into luminance image signals;
   Processing the luminance image signals within a luminance signal processor to obtain modified luminance image signals;
   Multiplying the color components by a transfer ratio of modified luminance to unmodified luminance to obtain modified color components;
   And wherein the step of processing the luminance signals comprises the steps of:
   (a) separating luminance image signal into low and high frequency components;
   (b) further separating by voltage polarity the high frequency component of step (a) into high frequency positive component and high frequency negative component;
   (c) changing the polarity of the high frequency negative component of step (b) to positive voltage signal called high frequency negative+component;
   (d) the low frequency component of step (a) is processed by a low frequency processor;
   (e) the high frequency positive component of step (b) is processed by a high frequency, positive, processor;
   (f) the high frequency negative+component of step (c) is processed by a high frequency, negative, processor;
   (g) within a combiner the processed high frequency negative+component from
   step (f) is subtracted from the sum of the processed low frequency component from step (d) and the processed high frequency positive component from step (e) to give the processed luminance.

2. The method of claim 1 wherein a variable mathematical exponent operator processing element is used for low frequency component modification.

3. The method of claim 2 further including a multiply by a variable processing element for low frequency component modification.

4. The method of claim 3 wherein the variable mathematical exponent is controlled by the output from an AGc circuit that obtains its input from the output of the multiplier processor element of claim 3.

5. The method of claim 3 further including circuitry for the generation of a control signal that is derived by first determining the multiplier processor element transfer ratio; then processing this ratio with a variable mathematical exponent operator.

6. The method of claim 3 further including circuitry for the generation of a control signal that is derived by first determining the multiplier processor element transfer ratio; then processing this ratio with a variable mathematical exponent operator.

7. The method of claim 2 wherein the variable mathematical exponent is controlled by the output from an AGC circuit that obtains its input from the output of the mathematical exponent operator processor element of claim 2.

8. The method of claim 2 further including circuitry for the generation of a control signal that is derived by first calculating the processor element transfer ratios; then processing these ratios with a variable mathematical exponent operator.

9. The method of claim 2 further including circuitry for the generation of a control signal that is derived by first calculating the processor element transfer ratios; then processing these ratios with a variable mathematical exponent operator.

10. The method of claim 1 wherein the high frequency, positive, processing element consists of a multiply by the control signal from claim 8 processing element.

11. The method of claim 10 further including a multiply by the control signal from claim 5 processing element.

12. The method of claim 11 further including a variable mathematical exponent operator processing element.

13. The method of claim 12 further including a multiply by a variable processing element.

14. The method of claim 10 further including a variable mathematical exponent operator processing element.

15. The method of claim 14 further including a multiply by a variable processing element.

16. The method of claim 10 further including a multiply by a variable processing element.

17. The method of claim 1 wherein the high frequency, positive, processing element consists of a multiply by the control signal from claim 5 processing element.

18. The method of claim 17 further including a variable mathematical exponent operator processing element.

19. The method of claim 18 further including a multiply by a variable processing unit.

20. The method of claim 17 further including a multiply by a variable processing element.

21. The method of claim 1 wherein the high frequency, positive, processing element consists of a variable mathematical exponent operator processing element.

22. The method of claim 21 further including a multiply by a variable processing element.

23. The method of claim 1 wherein the high frequency, negative, processing element consists of a multiply by the control signal from claim 9 processing element.

24. The method of claim 23 further including a multiply by the control signal from claim 6 processing element.

25. The method of claim 24 further including a variable mathematical exponent operator processing element.

26. The method of claim 25 further including a multiply by a variable processing element.

27. The method of claim 23 further including a variable mathematical exponent operator processing element.

28. The method of claim 27 further including a multiply by a variable processing element.

29. The method of claim 23 further including a multiply by a variable processing element.

30. The method of claim 1 wherein the high frequency, negative, processing element consists of a multiply by the control signal from claim 6 processing element.

31. The method of claim 30 further including a variable mathematical exponent operator processing element.

32. The method of claim 31 further including a multiply by a variable processing element.

33. The method of claim 30 further including a multiply by a variable processing element.

34. The method of claim 1 wherein the high frequency, negative, processing element consists of a variable mathematical exponent operator processing element.

35. The method of claim 34 further including a multiply by a variable processing element.

36. A dynamic range and contrast modification method wherein the luminance processor is homomorphic and comprises steps of:
   Converting an RGB electronic image signals of color components into luminance image signals;
   Processing the luminance image signals within a luminance signal processor to obtain modified luminance image signals;
   Multiplying the color components by a transfer ratio of modified luminance to unmodified luminance to obtain modified color components;

And wherein the step of processing the luminance signals comprises the steps of:

(a) separating luminance image signal into low and high frequency components;

(b) the low frequency component of step (a) is converted to proportional logarithmic signal, low frequency logarithmic component;

(c) further separating by voltage polarity the high frequency component of step (a) into high frequency positive component and high frequency negative component;

(d) the high frequency positive component of step (c) is converted to proportional logarithmic signal, high frequency positive logarithmic component;

(e) changing the polarity of the high frequency negative component of step (c) to positive voltage signal called high frequency negative+component;

(f) the high frequency negative+component of step (e) is converted to proportional logarithmic signal, high frequency negative+logarithmic component;

(g) the low frequency logarithmic component of step (b) is processed by a low frequency processor;

(h) the high frequency positive logarithmic component of step (d) is processed by a high frequency, positive, processor;

(i) the high frequency negative+logarithmic component of step (f) is processed by a high frequency, negative, processor;

(j) within a combiner the antilogarithmic function is performed on the processed low frequency logarithmic component from step (g) to give processed low frequency component.

(k) within the combiner the antilogarithmic function is performed on the processed high frequency positive logarithmic component from step (h) to give processed high frequency positive component.

(l) within the combiner the antilogarithmic function is performed on the processed high frequency negative+logarithmic component from step (i) to give processed high frequency negative+component.

(m) within the combiner the processed high frequency negative+component from step (l) is subtracted from the sum of the processed low frequency component from step (j) and the processed high frequency positive component from step (k) to give the processed luminance.

37. The method of claim 36 wherein a multiply by a variable processing element is used for low frequency logarithmic component modification.

38. The method of claim 37 further including a summation with a variable d.c. voltage processing element for low frequency logarithmic compoment modification.

39. The method of claim 38 wherein the variable for multiplication is controlled by the output from an AGC circuit that obtains its input from the output of the summation processor element of claim 38.

40. The method of claim 37 wherein the variable for multiplication is controlled by the output from an AGC circuit that obtains its input from the output of the multiplier processor element of claim 37.

41. The method of claim 37 further including circuitry for the generation of a control signal that is derived by first calculating the arithmetic difference between the multiplier processor element logarithmic signal output and logarithmic signal input; then multiplying this difference with a variable.

42. The method of claim 37 further including circuitry for the generation of a control signal that is derived by first calculating the arithmetic difference between the multiplier processor element logarithmic signal output and logarithmic signal input; then multiplying this difference with a variable.

43. The method of claim 38 further including circuitry for the generation of a control signal that is derived by multiplying the variable d.c. value with a variable.

44. The method of claim 38 further including circuitry for the generation of a control signal that is derived by multiplying the variable d.c. value with a variable.

45. The method of claim 36 wherein the high frequency, positive, processing element consists of a summation with the control signal from claim 41 processing element.

46. The method of claim 45 further including a summation with the control signal from claim 40 processing element.

47. The method of claim 46 further including a multiply by a variable processing element.

48. The method of claim 47 further including a summation with a variable d.c. value processing element.

49. The method of claim 45 further including a multiply by a variable processing element.

50. The method of claim 49 further including a summation with a variable d.c. value processing element.

51. The method of claim 45 further including a summation with a variable d.c. value processing element.

52. The method of claim 36 wherein the high frequency, positive, processing element consists of a summation with the control signal from claim 40 processing element.

53. The method of claim 52 further including a multiply by a variable processing element.

54. The method of claim 53 further including a summation with a variable d.c. value processing element.

55. The method of claim 52 further including a summation with a variable d.c. value processing element.

56. The method of claim 36 wherein the high frequency, positive, processing element consists of a multiply by a variable processing element.

57. The method of claim 52 further including a summation with a variable d.c. value processing element.

58. The method of claim 36 wherein the high frequency, negative, processing element consists of a summation with the control signal from claim 42 processing element.

59. The method of claim 58 further including a summation with the control signal from claim 41 processing element.

60. The method of claim 59 further including a multiply by a variable processing element.

61. The method of claim 60 further including a summation with a variable d.c. value processing element.

62. The method of claim 58 further including a multiply by a variable processing element.

63. The method of claim 62 further including a summation with a variable d.c. value processing element.

64. The method of claim 58 further including a summation with a variable d.c. value processing element.

65. The method of claim 36 wherein the high frequency, negative, processing element consists of a summation the control signal from claim 41 processing element.

66. The method of claim 65 further including a multiply by a variable processing element.

67. The method of claim 66 further including a summation with a variable d.c. value processing element.

68. The method of claim 65 further including a summation with a variable d.c. value processing element.

69. The method of claim 36 wherein the high frequency, negative, processing element consists of a multiply by a variable processing element.

70. The method of claim 69 further including a summation with a variable d.c. value processing element.

* * * * *